(12) United States Patent
Wry

(10) Patent No.: US 7,140,600 B1
(45) Date of Patent: Nov. 28, 2006

(54) PORTABLE AERATOR

(76) Inventor: Floyd Wry, 711 SE. 33rd Ter., Cape Coral, FL (US) 33904

( * ) Notice: Subject to any disclaimer, the term of this patent is extended or adjusted under 35 U.S.C. 154(b) by 72 days.

(21) Appl. No.: 10/858,833

(22) Filed: Jun. 2, 2004

Related U.S. Application Data

(60) Provisional application No. 60/474,407, filed on Jun. 2, 2003.

(51) Int. Cl.
*B01F 3/04* (2006.01)
(52) U.S. Cl. .......................... 261/121.2; 43/57
(58) Field of Classification Search .................. 261/84, 261/91, 93, 121.1, 121.2; 43/55, 56, 57
See application file for complete search history.

(56) References Cited

U.S. PATENT DOCUMENTS

| | | | | |
|---|---|---|---|---|
| 2,865,618 A | * | 12/1958 | Abell | 261/93 |
| 3,904,393 A | * | 9/1975 | Morse | 210/169 |
| 4,776,127 A | * | 10/1988 | Jackson | 43/57 |
| 4,829,698 A | * | 5/1989 | McDonald | 43/57 |
| 5,077,932 A | * | 1/1992 | Hetherington | 43/57 |
| 5,275,762 A | * | 1/1994 | Burgess | 261/4 |
| 5,582,777 A | * | 12/1996 | Vento | 261/93 |
| 5,676,889 A | * | 10/1997 | Belgin | 261/93 |

* cited by examiner

*Primary Examiner*—Scott Bushey
(74) *Attorney, Agent, or Firm*—William E. Noonan

(57) ABSTRACT

A portable aerator may be operated utilizing either internal direct current power or external alternating or direct current power. The aerator includes a housing in which are mounted an aerator pump and a motor for driving the aerator pump. The motor is connected to positive and negative contacts, which are interengagable by one or more direct current batteries. A jack mounted to the housing is electrically connected to the contacts and the jack is operably interengagable with an external adapter that is selectively attached to an external alternating or direct current power supply for supplying external power to the contacts and thereby to the motor. A switch may be employed to selectively provide power to and disconnect power from the motor.

6 Claims, 5 Drawing Sheets

PORTABLE AERATOR

RELATED APPLICATION

This application claims the benefit of U.S. Provisional Application Ser. No. 60/474,407, filed Jun. 2, 2003.

FIELD OF THE INVENTION

This invention relates to an aerator and in particular to a portable fish pump aerator that may be operated by either an internal or external power source.

BACKGROUND OF THE INVENTION

Portable aerators are commonly used to supply oxygen to fish held in an aquarium, bucket or other type of container. For example, fish that have just been caught are often placed in a bucket and an aerator is used to keep the fish alive. Such aerators are also used with a bait bucket in order preserve bait fish and other types of live bait. Aquariums may also occasionally require the use of a portable, battery powered aerator, particularly during power outages.

The conventional portable fish pump aerators that are presently available exhibit a number of disadvantages. These devices are powered by DC batteries which tend to have a fairly short life. Replacing the batteries can be time consuming, tedious and expensive. If the batteries die and the user does not have replacement batteries handy, the aerator is rendered useless. If no air is supplied to the bucket, aquarium or other container for an extended period, the fish are apt to die. I have determined that the need exists for a new portable fish pump aerator that is more versatile, cost-efficient and reliable than the products which are currently available.

SUMMARY OF THE INVENTION

It is therefore an object of the present invention to provide a portable fish pump aerator that is powered selectively by either direct current or alternating current.

It is a further object of the inventor to provide an aerator that may be operated by either an internal or external power source.

It is the further object of this invention to provide a fish pump aerator that is much more efficient and less expensive to operate than existing products.

It is the further object of this invention to provide a fish pump aerator that is conveniently transportable and is suited for use at various locations and settings such as on a boat dock or fishing pier, on a boat and at home.

It is the further object of this invention to provide a portable aerator that employs an AC adapter, which significantly extends battery life.

It is the further object of this invention to provide a fish pump employing batteries that can be recharged while remaining within the aerator.

It is the further object of this invention to provide a portable fish pump aerator that is more efficient, versatile, and reliable than existing products and which is far less apt to run out of power during use.

This invention features a portable aerator including a housing that encloses an aerator pump and a motor for driving the aerator pump. The motor is selectively operated by one of a direct current power source mounted within the housing and an alternating current power source located externally of the housing. A switch interconnects the direct and alternating current power sources to the motor. The switch is alternated between a first state, wherein power is provided from the selected power source to the motor for operating the motor and driving the pump, and a second state for electrically disconnecting the motor from the power sources and deactivating the motor and the pump.

In a preferred embodiment, the internally mounted direct power current source includes one or more batteries that are operably mounted between a pair of spaced apart positive and negative contacts connected respectively to the switch and the motor. The batteries may be rechargeable. The motor may be selectively connected to a standard alternating current power source by means of a jack or other type of connector mounted in the housing. The jack may be electrically connected to the spaced apart contacts and may receive the plug of a standard alternating current adapter. The opposite end of the adapter may be operably engaged with an alternating current power outlet found in the wall of a building or elsewhere.

The pump may comprise a diaphragm pump. The switch may include a toggle switch mounted on and exposed from the housing.

This invention also features a portable aerator including a motor-driven pump and both internal and external DC power sources. Once again, a switch is interconnected between each of the power sources and the motor. The housing carries a connector, which is selectively engaged by an adapter that is, in turn, selectively connected with the external power source. When the external power source is attached to the connector, the external power source overrides the internal power source to provide power to the motor. The external direct current power source may comprise a standard lighter outlet of a motor vehicle.

DETAILED DESCRIPTION OF PREFERRED EMBODIMENTS

Other objects, features and advantages will occur from the following description of a preferred embodiment and the accompanying drawings, in which.

Figure 4:
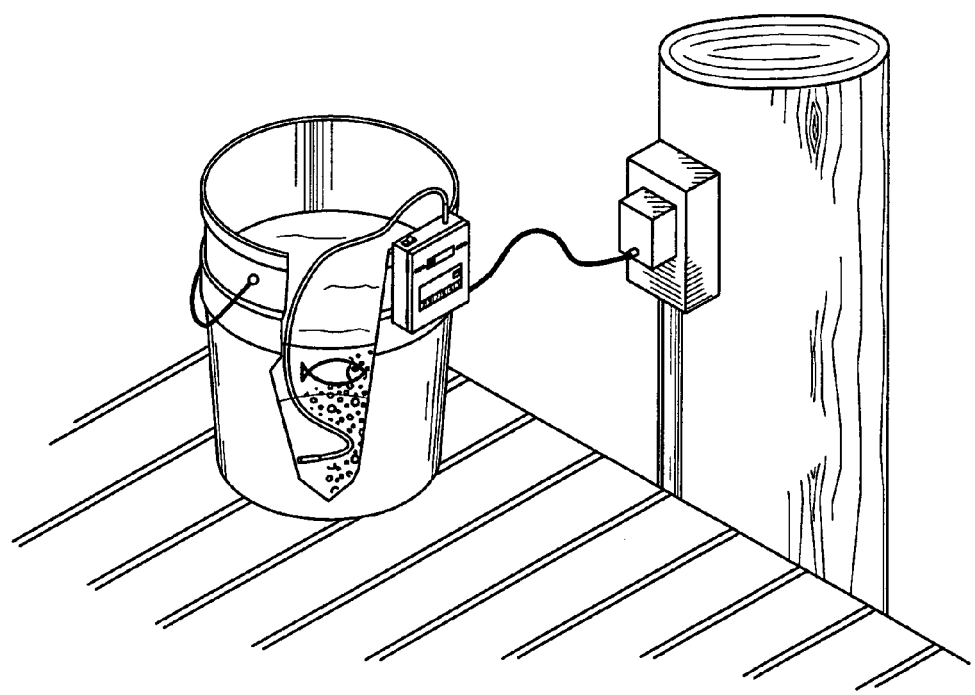
Figure 5:
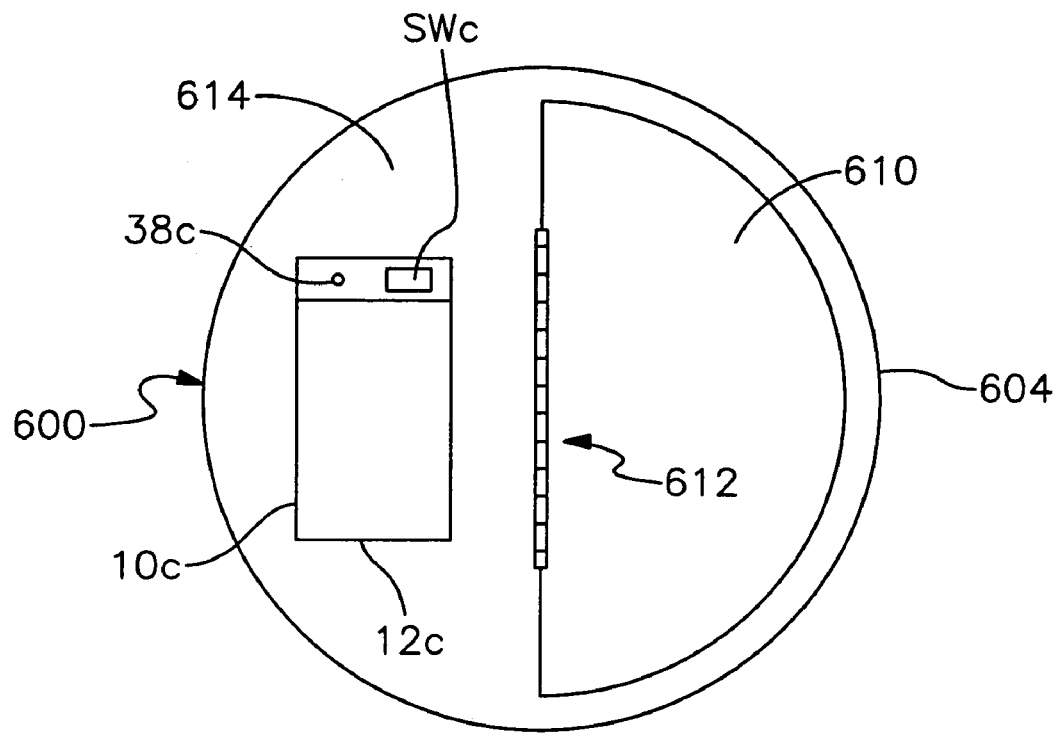
Figure 6:
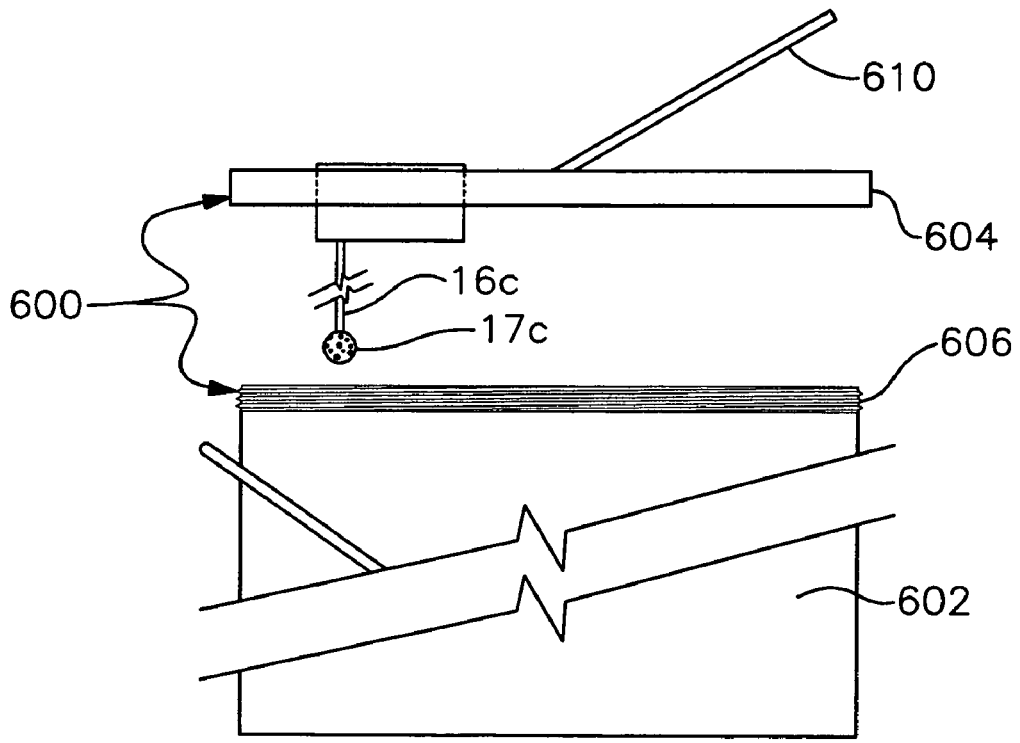

FIG. 4 (is) a perspective view of the portable aerator in use with a fish bucket; and FIGS. 5 and 6 respectively comprise top and elevated side views of a portably aerated bait bucket apparatus according to this invention.

Figure 1:
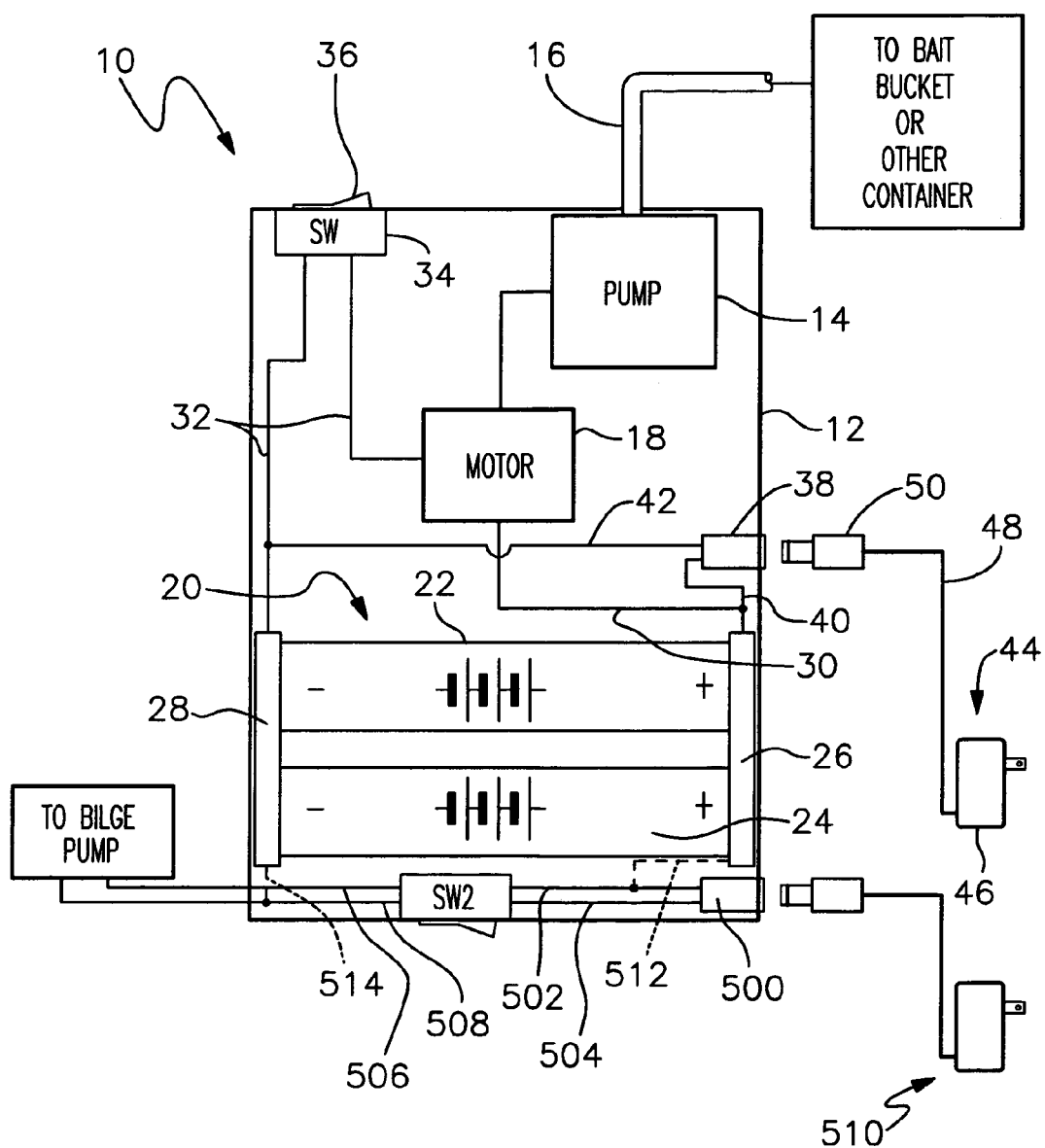
FIG. 1 is a schematic view of a preferred version of the portable fish pump aerator of this invention which aerator operates on either direct current or alternating current.

There is shown in FIG. 1 a portable aerator 10 comprising a housing 12. The housing is preferably constructed of a durable plastic and includes a conventional size and shape, which are designed to make the product conveniently portable. In certain versions, a clip (not shown) may be mounted to the outside of housing 12 to allow the product to be conveniently attached to a bait bucket, aquarium or other type of fish accommodating container. Typically, housing 12 includes a door (not shown) that is selectively opened to reveal the internal components of the aerator. An appropriate latch or lock, which again is conventional and not specifically shown, may be employed to hold the door of the housing closed during usage of the product.

A diaphragm-type pump 14 is mounted within the housing and communicably connected to an air outlet conduit 16 that extends through and outwardly the wall of housing 12. The conduit normally comprises a plastic tube selectively attached to an air discharge port mounted in the housing. The opposite, outlet end of tube 16 (not shown) is placed in a fish holding container during usage of the aerator.

A motor 18 is mounted, once again in a conventional fashion, within housing 12 and is operably connected in a known manner to pump 14. Various types of known motors, which are already in use in portable aerators, may be utilized. When motor 18 is activated, it drives diaphragm pump 14 so that air is pumped through tube 16 to the fish-holding container.

A DC power source 20 comprising a pair of batteries 22 and 24 are mounted in a lower portion of housing 12. In particular, batteries 22 and 24 are removably inserted between positive and negative contacts 26 and 28, respectively, which are in turn mounted to the interior walls of housing 12. Contacts 26 and 28 comprise conventional DC battery contacts. Typically the batteries are held in place by coil springs (not shown), which are mounted and extend from negative contact 28. The springs bear against the negative ends of batteries 22 and 24 and thereby bias the positive ends of the batteries against positive contact 26. Once again, this is a conventional structure utilized in presently available air pumps or aerators. It should be understood that various other types of battery arrangements, as well as other numbers of batteries may be utilized within the scope of this invention.

Positive and negative contacts 26 and 28 are electrically interconnected to motor 18. Specifically, a positive wire 30 joins positive contact 26 to a positive terminal of motor 18. A negative wire 32 similarly interconnects contact 28 to a negative terminal of motor 18. Wire 32 is connected through an on/off toggle switch 34. When batteries 22 and 24 are mounted in place between contacts 26 and 28, in the manner shown in FIG. 1, pump 14 is operated by engaging button 36 of switch 34. This closes the switch so that direct current power is provided from the batteries to motor 18. The motor is activated, which in turn drives pump 14. Air is thereby pumped through tubing 16 to the fish accommodating container.

Aerator 10 is deactivated by simply engaging button 34 and thereby urging toggle switch 34 into an open, second state. This disconnects the motor from the direct power source 20. The motor which is turn deactivated, stops operation of pump 14.

Once again, virtually all of the foregoing structure is conventional. The present invention specifically relates to the additional use of an external adapter, which allows the aerator to be selectively connected to and driven by an external AC and/or DC power source. In the version of FIG. 1, an alternating current connector jack 38 is mounted to the exterior wall of housing 14 such that a receptacle port of jack 38 is exposed exteriorly of the housing. A pair of positive and negative wires 40 and 42, respectively, are joined electrically to jack 38 by means such as soldering or wire clips. The opposite end of positive wire 40 is connected to positive contact 26. Once again, solder or a standard wire clip is used for making this connection. The opposite end of negative wire 42 is electrically attached in an analogous manner to negative contact 28.

A commonly available commercial variety AD-DC adapter 44 may selectively interconnect the aerator to an available AC power outlet. Various types of commercially available AC-DC adapters may be used such as the Nippon America Model 5467, having an input of 110/220 volts and 60/50 Hertz. Adapter 44 includes a two-blade plug portion 46 that is secured to a conventional AC power outlet in a standard manner. Plug portion 46 is connected through an adapter cord 48 to a distal male plug component 50. This component is selectively interengaged with (received by) female jack 38 to electrically attach adapter 44 to aerator 10.

In operation, the user can operate aerator 10 by either direct current or alternating current power. The device is driven by batteries 22 and 24 in the manner previously described. Where a standard AC outlet is available (for example, at home or on a dock or pier) the batteries can be conserved by plugging the aerator into the AC power source through the use of adapter 44. This is accomplished by first plugging male plug 50 into jack 38. Two blade plug 46 is then inserted into the AC outlet so that AC power is provided through cord 48 to jack 38. Electrical power is then provided through wires 40 and 42, contacts 26 and 28, and wires 30 and 32 to motor 18. When switch 34 is closed or maintained in a first state, AC power is thereby provided through the adapter and internal circuitry of the aerator to the motor. The motor is operated to drive pump 14. As a result, air is pumped through the outlet tubing 16 to the container holding the fish. To turn the aerator off, switch 34 is alternated into the second state to open the switch and deactivate the motor and pump.

The foregoing apparatus operates effectively using AC power, whether or not batteries 22 and 24 are mounted between contacts 26 and 28. Even if the batteries are removed from the housing, the use of adapter unit 44 permits alternating current power to be provided to the motor through the adapter, contacts and internal wiring of the apparatus. In various embodiments, rechargeable batteries may be employed. In such cases the AC adapter unit may be utilized to recharge the batteries. This results in extremely long battery life and an efficient, low-cost product.

Even in cases where an AC power source is not available, the ability of the product to operate at times using a AC adapter provides for significant benefits. The direct current batteries need to be used only in the absence of the overriding AC power source. This contributes significantly to extended battery life and reduces the cost and hassle associated with constantly having to change batteries. The disposable DC batteries are also much less likely to expire at a remote location. As a result, there is much less risk that the aerator will be rendered inoperable and that fish or live bait will die due to the lack of oxygen.

Figure 2:
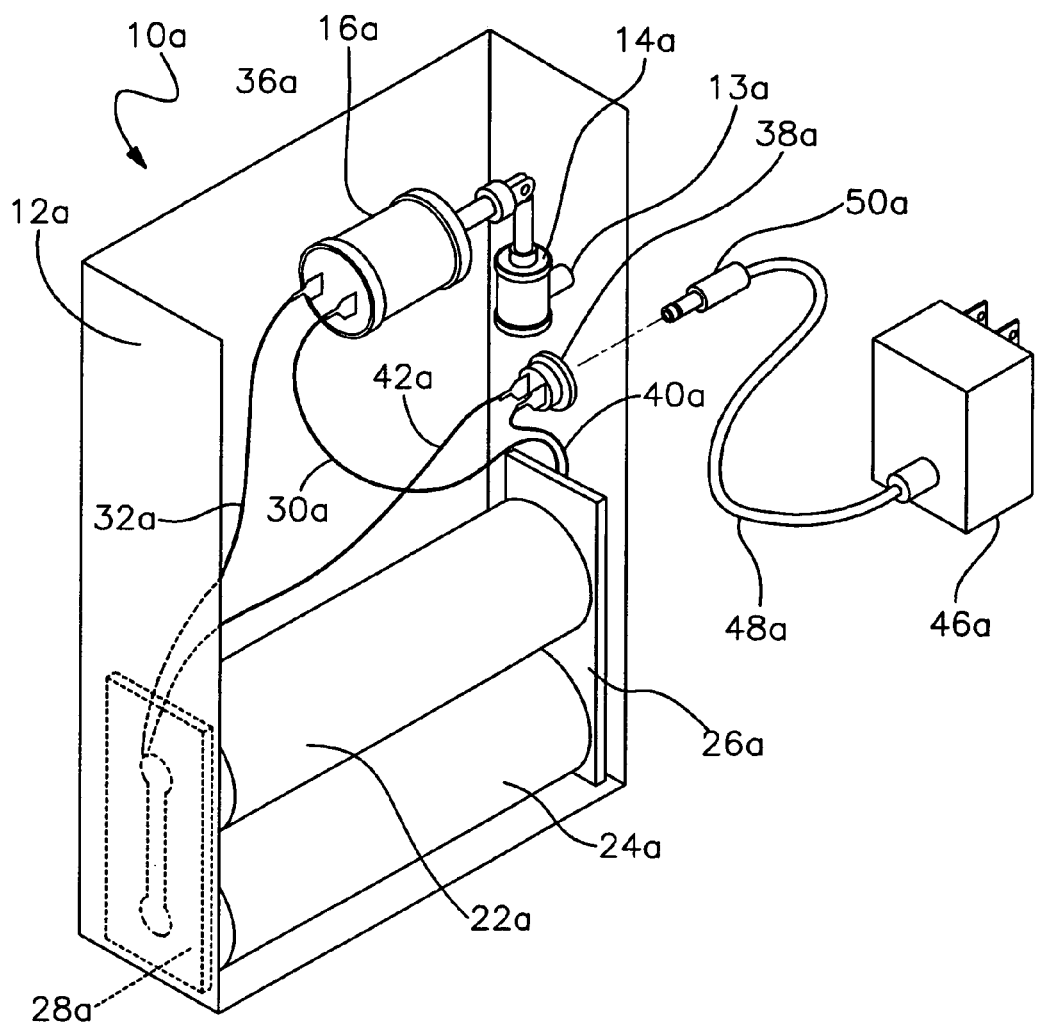
FIG. 2 is a perspective view of a slightly modified aerator, with the cover open to reveal the internal components.

A slightly modified aerator 10a is depicted in FIG. 2. In this version, In this embodiment, the switch is eliminated from the aerator. Otherwise, the components are analogous to those disclosed in the prior embodiment. Specifically, a diaphragm pump 14a and a motor 16a for driving the pump are mounted within housing 12a of aerator 10a. A discharge port 13a extends from pump 14a through the wall of housing 12a. An air transmitting tube (not shown) is typically attached to port 13a. Positive/negative contacts 26a and 28a respectively are connected to corresponding positive/negative terminals of motors 16a by wires 30a and 32a. In this version, the wire 32a is connected directly from negative terminal 28a to motor 16a, without an intervening switch.

A female port or jack 38a is carried by housing 12a and selectively engagable by a power plug 50a of power adapter 44a. A two-blade plug 46a of adapter 44a is selectively engagable with a standard AC outlet. Jack 38a is connected to contacts 26a and 28a by wires 40a and 42a respectively.

Once again, the version of FIG. 2 may be operated by either direct current batteries or alternating current. When no alternating current source is available, a pair of "D" batteries 22a and 24a (or alternative battery means) are inserted between contacts 26a and 28a. This provides electrical power to motor 16a, which in turn drives pump 14a.

Alternatively, overriding alternating current may be provided to aerator 10a through power adapter 44a. Specifically, power plug 50a is engaged with jack 38a and two-blade plug 46a is engaged with a standard AC outlet (not shown). AC power is then transmitted through power cord 48a to plug 50a; and power is thereby transmitted through jack 38a and wires 40 and 42a to contacts 26a and 28a. This electrical power is in turn, transmitted to motor 16a which drives the aerator pump. The device is thereby able to be operated without turning on a switch. It is obvious that this version can be easily modified by adding the switch in the manner shown in FIG. 1.

As shown in FIG. 1, a second switch SW2 may be mounted within housing 12 for selectively operating a conventional water or bilge pump, not shown, which is located in the bait bucket. Switch SW2 may be interconnected to a secondary AC jack 500 through positive and negative wires 502 and 504 respectively. Likewise, the switch SW2 may be connected to the bilge pump by positive and negative wires 506 and 508 respectively. When an AC adapter device 510 is plugged into jack 500 and switch SW2 is closed, the pump is operated to pump water through a suitable spray bar or other sprayer device, not shown. This circulates water through the bait bucket and thereby further aerates the bucket in a known manner.

In alternative versions, switch SW2 may be connected through battery contacts 26 and 28 by wiring 512 and 514 shown in phantom. This enables the switch operated bilge pump to be powered by batteries in a manner analogous to the motor 18.

Figure 3:
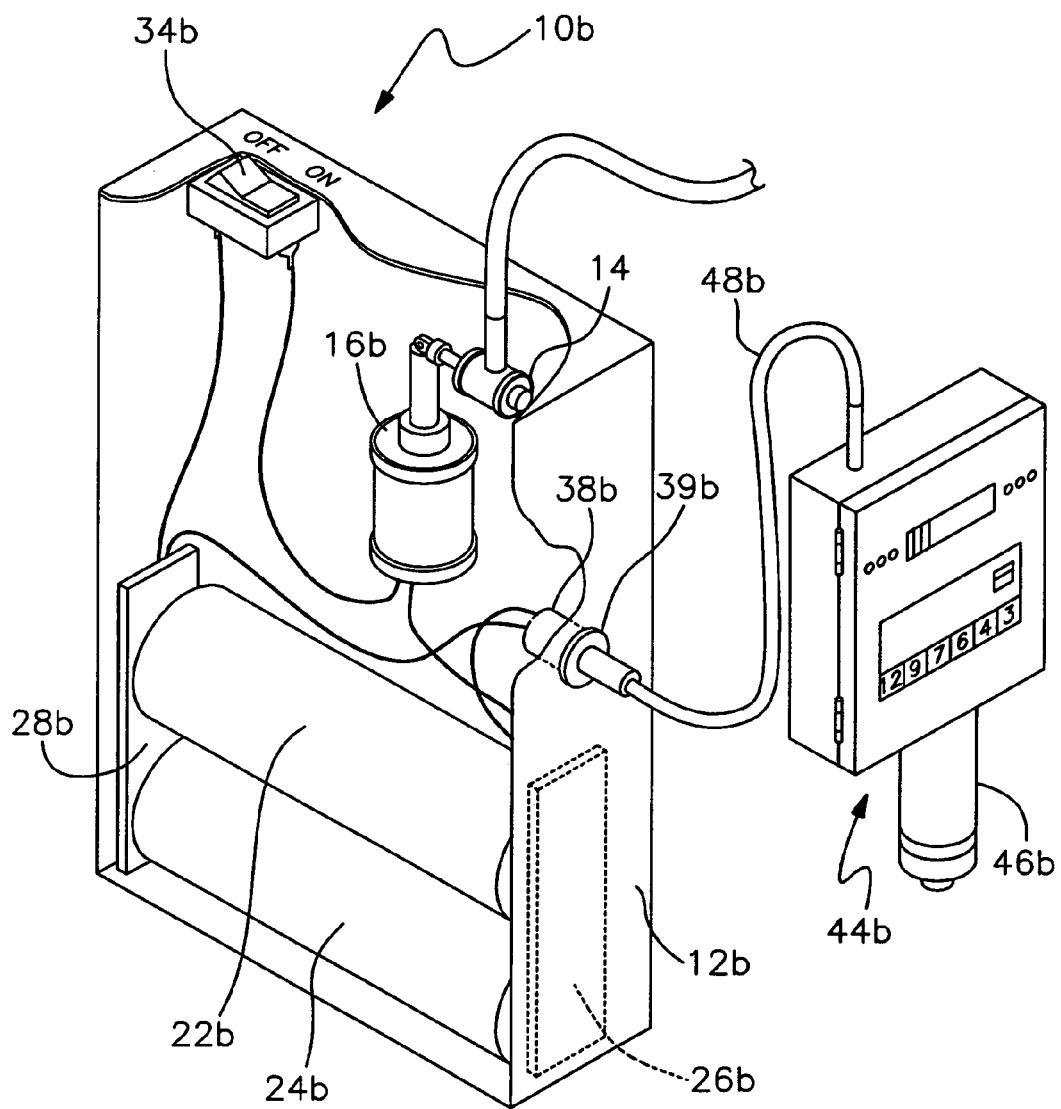
FIG. 3 is a perspective view of another version of the aerator, which employs a universal DC adapter that enables the aerator to be connected to an external power source such as a standard motor vehicle lighter socket.

Another alternative version of the aerator 10b is depicted in FIG. 3. This embodiment employs a number of components that are virtually identical to those shown in the version FIG. 1. Specifically, housing 12b accommodates an air pump 14b and a motor 16b for driving the pump. The motor is electrically connected to positive and negative contacts 26b and 28b. The negative contact 28b is connected to the motor through an on/off toggle switch 34b. In this embodiment, rechargeable DC batteries 22b and 24b are shown mounted between contacts 26b and 28b.

A jack 38b having an externally exposed receptacle 39b is mounted in the wall of housing 12b. Jack 38b is electrically connected to contacts 26b and 28b in a manner identical to that shown in the previously described embodiments. Indeed, the internal wiring of aerator 10b is identical or closely similar to that previously described. A universal DC adapter 44b is selectively connected through a power cord 48b to jack 38b. Adapter 44b includes a main plug 46b that is selectively engagable with a standard external DC power source, such as but not limited to the DC power supply conventionally provided by a standard motor vehicle cigarette lighter socket. The adapter plug 46b may alternatively be operably engaged with other types of external DC power supplies.

The version of FIG. 3 may be operated using either the rechargeable batteries or an external direct current power. When no external direct current source is available, the batteries are employed to operate the pump. Where a motor vehicle lighter jack or other standard direct current power supply is available, plug 46d may be selectively inserted into that power supply to provide power to device 10b through jack 38b. Where batteries are present in the aerator, the external DC power source overrides these batteries so that they are not prematurely drained. By the same token, if rechargeable batteries 22b and 24b are utilized, the batteries will be recharged by the external direct current supply during use of the aerator.

In the version shown in FIGS. 5 and 6, a portably aerated bait bucket apparatus 600 includes a water accommodating bucket 602 and an upper lid or cover 604 that is releasably engaged to the open upper end of bucket 602. For example, cover 604 and bucket 602 may include complementary threads (see threads 606 at the upper end of bucket 602), which allow the cover to be selectively attached onto and removed from the bucket.

Cover 602 includes a semi-circular entry hatch 610 that is hingedly attached (such as by piano hinge 612) to the body 614 of cover 610. Hatch 610 may be selectively raised as shown in FIG. 6 so that access to the interior of bucket 602 is provided without the need for removing cover 604. This allows bait or live fish to be conveniently deposited into or removed from the bait bucket as required.

An aerator 10c having the features and components similar to those previously described, is permanently or releasably mounted within body 614 of cover 610. In particular, body 614 may include an opening that snugly receives and supports the housing 12c of aerator 10c. Brackets and other means of attachment (not shown) may also be employed. The housing may also include a peripheral lip that engages the body of the cover to support the aerator in the cover. An aerator tube 16c is operably connected to aerator 10c in the manner previously described such that the aerator tube extends downwardly from the housing 12c of aerator 10c into the bucket and the water contained therein. Any suitable length of tubing may be provided such that the lower end of the tubing is introducible into the water contained in the bucket. A standard aerator stone 17c is operably and communicably connected to the distal end of tubing 16c.

As best shown in FIG. 5, an AC power jack 38c, as previously described, is mounted in the housing. Likewise, a switch SWc is mounted in the housing in the previously described manner. As also previously described, the aerator may be powered by an AC adapter engaged with jack 38c and/or internal batteries. In either case, when switch SWc is actuated, the aerator operates to pump air through tubing 16c and aerator stone 17c into the water contained within the bucket. Apparatus 600 thereby conveniently mounts the aerator to the cover and effectively prevents live bait or caught fish from escaping.

Each of the versions depicted herein represents a significant improvement over the prior art. Batteries of the aerator are not prematurely drained when an external alternating or direct current power source is available. Rather, the external source may be accessed and used to operate the aerator pump, thereby conserving the batteries and extending battery life considerably. This reduces the cost of operating the product and also helps to avoid premature and unexpected failure of the device, which may otherwise occur when the batteries prematurely die at a remote location. Because the batteries are less likely to prematurely die, fish and/or bait are able to receive a dependable supply of oxygen and are less likely to die due to battery failure. The hassle and expense of having to constantly change batteries is significantly reduced.

From the foregoing, it may be seen that the apparatus of this invention provides for a portable aerator that is operated by either direct current or alternating current power and which particularly may be operated by either an internal or external power source. While this detailed description has set forth particularly preferred embodiments of the apparatus of this invention, numerous modification and variations of the structure of the invention, all within the scope of the invention, will occur to those skilled in the art. Accordingly, it is understood that this description is illustrative only of the principles of the invention and is not limitative thereof.

Although specific feature of the invention are shown in some of the drawings and not others, this is for convenience only, as each feature may be combined with any and all of the other features in accordance with this invention.

The invention claimed is:

1. A portable aerator comprising:
a housing that encloses an aerator pump and a motor for driving said aerator pump, said motor being selectively operated by one of a direct current power source mounted within said housing and a standard alternating current power source located externally of said housing; and
a switch interconnecting said direct and alternating current power sources to said motor, said switch being alternated between a first state wherein power is provided from the selected power source to said motor for operating the motor and driving said pump, and a second state for electrically disconnecting said motor from said power source and deactivating said motor and said pump; said direct current power source including one or more rechargeable batteries that are operably mounted between a pair of spaced-apart positive and negative contacts connected respectively to said switch and said motor, said motor being selectively interconnectable to the standard alternating current power source through a connector jack mounted in said housing; said jack being electrically connected to said spaced-apart contacts for receiving a plug of a standard alternating current adaptor, said adaptor including a connector that is operably engaged with an alternating current power outlet.

2. The device of claim 1 in which said pump includes a diaphragm pump.

3. The device of claim 1 in which said switch includes a toggle switch mounted on and exposed from said housing.

4. The device of claim 1 further including a second switch for selectively connecting at least one of said power sources to a water pump located externally of said housing.

5. The device of claim 1 in which said one or more batteries comprise an internal DC power source and further including an external DC power source; said switch being interconnected between each of said internal and external power sources and said motor; and said jack being selectively engaged by a DC adaptor that is selectively connected to said external DC power source whereby said external DC power source overrides said internal power source to provide electric power to said motor.

6. The device of claim 5 in which said external direct current power source includes a standard lighter outlet in a motor vehicle.

* * * * *